(12) United States Patent
Ismael et al.

(10) Patent No.: US 10,025,691 B1
(45) Date of Patent: Jul. 17, 2018

(54) VERIFICATION OF COMPLEX SOFTWARE CODE USING A MODULARIZED ARCHITECTURE

(71) Applicant: FireEye, Inc., Milpitas, CA (US)

(72) Inventors: Osman Abdoul Ismael, Palo Alto, CA (US); Hendrik Tews, Dresden (DE); Ashar Aziz, Coral Gables, FL (US)

(73) Assignee: FireEye, Inc., Milpitas, CA (US)

( * ) Notice: Subject to any disclaimer, the term of this patent is extended or adjusted under 35 U.S.C. 154(b) by 0 days.

(21) Appl. No.: 15/261,327

(22) Filed: Sep. 9, 2016

(51) Int. Cl.
  G06F 11/36 (2006.01)
  G06F 9/455 (2018.01)
  G06F 21/57 (2013.01)
  G06F 21/56 (2013.01)
  G06F 21/62 (2013.01)

(52) U.S. Cl.
  CPC ...... G06F 11/3608 (2013.01); G06F 9/45558 (2013.01); G06F 21/566 (2013.01); G06F 21/577 (2013.01); G06F 21/6218 (2013.01); G06F 2009/45587 (2013.01); G06F 2221/033 (2013.01)

(58) Field of Classification Search
  CPC .................................................. G06F 11/3608
  USPC ........................................................ 717/126
  See application file for complete search history.

(56) References Cited

U.S. PATENT DOCUMENTS

| 7,146,605 | B2 | 12/2006 | Beer et al. |
| 7,770,202 | B2 * | 8/2010 | Brumme ................. G06F 9/468 |
| | | | 713/182 |
| 8,244,516 | B2 | 8/2012 | Arbel et al. |
| 8,347,288 | B1 | 1/2013 | Brandwine |
| 9,740,857 | B2 | 8/2017 | Ismael et al. |
| 2002/0019941 | A1 | 2/2002 | Chan et al. |

(Continued)

FOREIGN PATENT DOCUMENTS

WO  WO-2009095741 A1  8/2009

OTHER PUBLICATIONS

Brucker, et al., On theorem prover-based testing, Formal Aspects of Computing, 25.5 (2013), pp. 683-721.

(Continued)

*Primary Examiner* — Evral E Bodden
(74) *Attorney, Agent, or Firm* — Rutan & Tucker, LLP

(57) ABSTRACT

A technique verifies a compound software code using a modularized architecture. The compound software code may be divided into smaller components or modules that provide various functions (e.g., services) of the code. A set of properties may be defined for the modules, such that the verification technique may be used to verify that the modules manifest those properties, wherein at least one property may be security related and the remaining properties may be related to the services of the modules. The compound software code is divided into smaller modules to facilitate verification of the properties related to the services provided by the modules. Properties of the modules may be verified in accordance with an enhanced verification procedure to demonstrate that the modules manifest those properties and transform those modules into verified code bases (VCBs). The services of the VCBs may then be combined to provide functionality of the compound software code using well-defined interfaces, such as application programming interfaces (APIs).

20 Claims, 7 Drawing Sheets

(56) References Cited

U.S. PATENT DOCUMENTS

| | | | |
|---|---|---|---|
| 2007/0288897 A1* | 12/2007 | Branda | G06F 8/70 717/124 |
| 2008/0244569 A1 | 10/2008 | Challener et al. | |
| 2010/0153924 A1 | 6/2010 | Andrews | |
| 2011/0258607 A1 | 10/2011 | Bhatt et al. | |
| 2012/0198514 A1 | 8/2012 | McCune et al. | |
| 2012/0260345 A1 | 10/2012 | Quinn et al. | |
| 2013/0254772 A1 | 9/2013 | Corthesy et al. | |
| 2014/0075522 A1 | 3/2014 | Paris et al. | |
| 2014/0130158 A1 | 5/2014 | Wang et al. | |
| 2016/0299851 A1* | 10/2016 | Mattson, Jr. | G06F 12/145 |

OTHER PUBLICATIONS

Common Criteria for Information Technology Security Evaluation, Part 3: Security assurance components Version 3.1, Revision 4, CCMB-2012,—Sep. 2012, 233 pages.

Crocker, et al., Verification of C programs using automated reasoning, Software Engineering and Formal Methods, 2007. SEFM 2007. Fifth IEEE International Conference on. IEEE, 2007, pp. 7-14.

Del Grosso et al., An evolutionary testing approach to detect buffer overflow, Student Paper Proceedings of the International Symposium of Software Reliability Engineering (ISSRE), St. Malo, France, 2004, 2 pages.

Dybjer, et al., Verifying Haskell programs by combining testing and proving, Quality Software, 2003. Proceedings. Third International Conference, IEEE, 2003, 8 pages.

Fernandez, et al. "Towards a verified component platform," *Proceedings of the Seventh Workshop on Programming Languages and Operating Systems*. ACM, 2013, 7 pages.

Fernandez, et al. "CAmkES glue code semantics." Apr. 2013, 45 pages.

Garfinkel, et al. "Terra: A virtual machine-based platform for trusted computing." *ACM SIGOPS '03, ACM*, Oct. 2003, 14 pages.

Gebhardt, Carl. "Towards Trustworthy Virtualisation: Improving the Trusted Virtual Infrastructure." Technical Report RHUL-MA-2011-10, Mar. 17, 214 pages.

Gollmann, Dieter. "Why trust is bad for security." *Electronic notes in theoretical computer-science* 157.3,2006, pp. 3-9.

Hepburn, et al. "Execution Contexts for Determining Trust in a Higher-Order pi-Calculus." School of Computing, University of Tasmania Technical Report R-01-2003, 2003, 36 pages.

Hudak, Paul, "Conception, evolution, and application of functional programming languages." *ACM Computing Surveys (CSUR)* 21.3 (1989): 359-411.

Klein, et al. "seL4: Formal verification of an OS kernel." *Proceedings of the ACM SIGOPS 22nd symposium on Operating systems principles*. ACM, 2009, pp. 207-220.

Latham, Donald C. "Department of Defense Trusted Computer System Evaluation Criteria." *Department of Defense* (1986), 116 pages.

Marsh, Stephen "Formalising trust as a computational concept." *Ph.A dissertation. University of Stirling*, Scotland (1994), 184 pages.

McCune, et al. "Flicker: An execution infrastructure for TCB minimization." *ACM SIGOPS Operating Systems Review*. vol. 42. No. 4. ACM, 2008, 14 pages.

McCune, et al. "TrustVisor Efficient TCB reduction and attestation," *CyLab, Carnegie Mellon University*, CMU-CyLab-09-003, Mar. 9, 2009 (revised Mar. 10, 2010), 17 pages.

Mohammad, et al. "A formal approach for the specification and verification of trustworthy component-based systems." *ACTS Research Group, ACTS Report Series*, May 2009, 73 pages.

Mohammad et al. "A component-based development process for trustworthy systems," *ACTS Research Group, ACTS Report Series*, Sep. 2009, 48 pages.

Parker, Timothy. *Protecting Cryptographic Keys and Functions from Malware Attacks*. Diss, Texas Univ at San Antonio Dept of Computer Science, 2010, 116 pages.

Parno, Bryan, Thesis—"Trust extension as a mechanism for secure code execution on commodity computers." 2010, 203 pages.

PCT Notification of Transmittal of the International Search Report and the Written Opinion of the International Searching Authority, or the Declaration, International Searching Authority, International Application No. PCT/US2015/038616, dated Sep. 16, 2015, 9 pages.

Popovic et al., An approach to formal verification of embedded software, Proc. of 15th WSEAS Int. Conf. on Computers, 2011, pp. 29-34.

Rushby, John, Software verification and system assurance. Software Engineering and Formal Methods, 2009 Seventh IEEE International Conference, IEEE, 2009, pp. 3-10.

Santos, et al. "Trusted language runtime (TLR): enabling trusted applications on smartphones." *Proceedings of the 12th Workshop on Mobile Computing Systems and Applications*. ACM, 2011 6 pages.

Santos, Nuno, et al. "Using ARM trustzone to build a trusted language runtime for mobile applications." *Proceedings of the 19th international conference on Architectural support for programming languages and operating systems*. ACM, 2014, 14 pages.

Sewell, et al. "Translation validation for a verified OS kernel." *ACM SIGPLAN Notices* 48.6, 2013, 11 pages.

Stumpf, et al. "An approach to a trustworthy system architecture using virtualization." *Autonomic and trusted computing*. Springer Berlin Heidelberg, 2007, pp. 191-202.

Tews, Hendrik. "Micro hypervisor verification: Possible approaches and relevant properties." *NLUUG Voorjaarsconferentie*, Apr. 2007, 14 pages.

Wikipedia—"Haskell (programming language)" description, printed Oct. 4, 2013, 11 pages.

Wikipedia—"Hoare logic" description, printed Oct. 4, 2013, 7 pages.

* cited by examiner

VERIFICATION OF COMPLEX SOFTWARE CODE USING A MODULARIZED ARCHITECTURE

BACKGROUND

Technical Field

The disclosure herein relates to testing of complex software code and, more specifically, to verification testing of complex software code using a modularized architecture.

Background Information

A conventional software testing approach for a modularized software application (i.e., code) typically involves extensive testing, e.g., unit testing, of each module against a specification so as to verify that each module manifests a desired property, e.g., crash-free and error-free. Although errors/bugs may be discovered through the extensive testing, the conventional approach does not result in a conclusive determination that each module manifests the desired property, as the testing may be incorrect or incomplete and the specification may be incorrect or incomplete. That is, testing of the modularized code against a specification does not verify a property of that specification. The problem is more acute as the size, number, and complexity of the modules increase.

As such, it is desirable to provide a technique to verify an entire application that has a complex software code by using verified software components or modules, so that the application can be authored efficiently. Accordingly, it is further desirable to verify that the modules manifest the desired properties, e.g., do not have errors and will not crash once deployed, and that those properties are verifiable and, once verified, that the modules are immutable for those properties.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
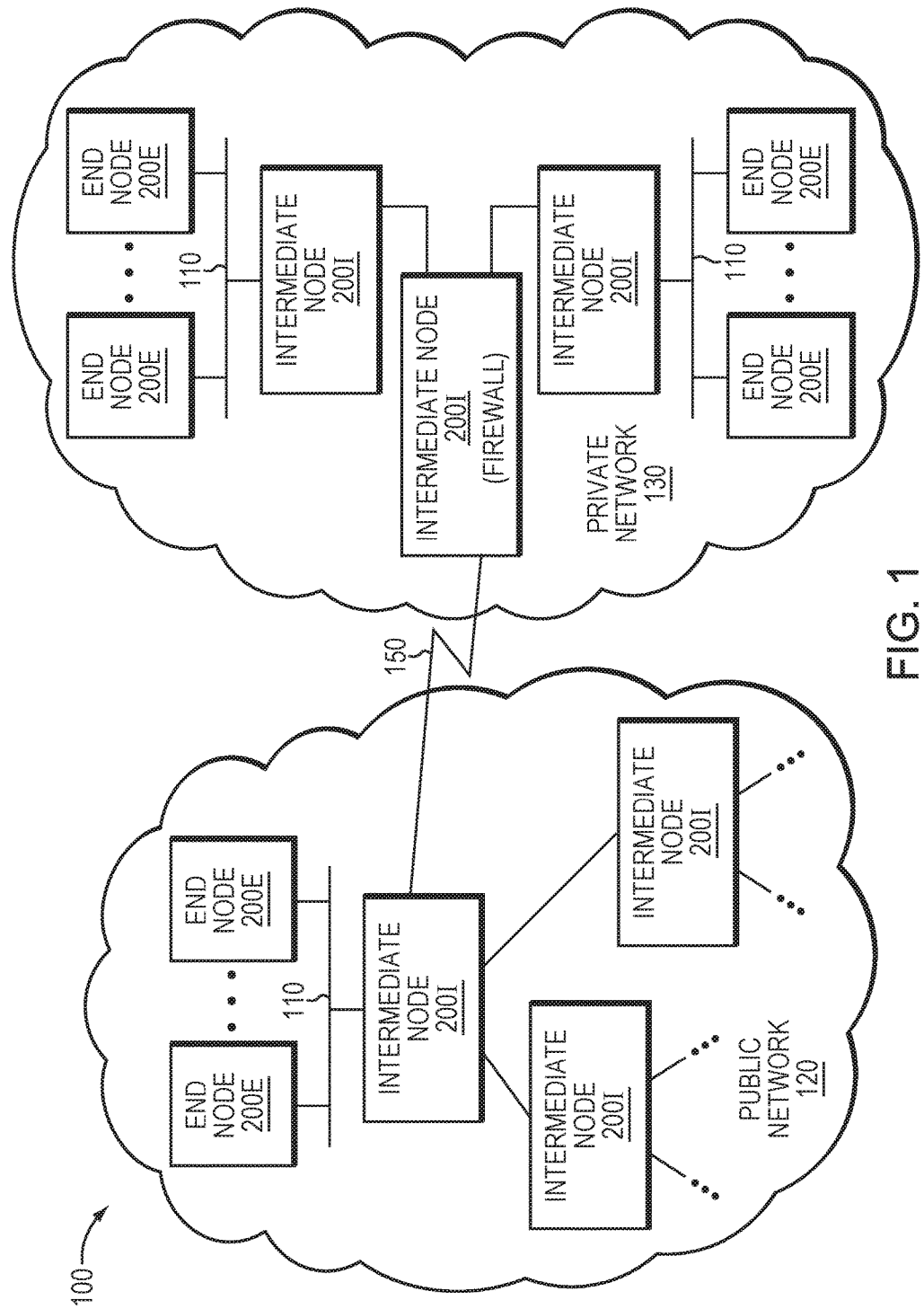
FIG. 1 is a block diagram of a network environment that may be advantageously used with one or more embodiments described herein.

The embodiments herein are directed to a technique for verifying (e.g., for trustedness) a compound software code using a modularized architecture. The compound software code may be divided into smaller components or modules that provide various functions (e.g., services) of the code. One or more sets of properties may be provided for the modules, such that the verification technique herein may be used to verify that the modules manifest those properties as a whole, which may be security related or may be related to the services of the modules. Illustratively, the compound software code is divided into smaller modules (i.e., having fewer lines of software code) to facilitate verification of the properties related to the services provided by the modules. As such, the one or more properties may be verified for the smaller modules resulting in an overall (i.e., comprehensive) property of the compound software as a whole being verified. According to the technique, properties of the modules may be verified in accordance with an enhanced verification procedure to demonstrate that the modules manifest those properties (e.g., security properties) and thereby transform those modules into verified code bases (VCBs). The services of the VCBs may then be combined to provide functionality of the compound software code using well-defined interfaces, such as application programming interfaces (APIs). Notably, the one or more sets of properties verified for each VCB may vary by module and may include one or more security properties. Moreover, when one or more security properties are verified for a module, that module transforms into a trusted code base (TCB) that may be subsumed into an existing TCB, i.e., the existing TCB may be expanded (i.e., extended) to include the module having the verified security properties.

In an embodiment, the VCBs are disposed over a TCB of a node, such as an endpoint, in various configurations to communicate with the TCB and each other via the APIs. The TCB illustratively includes a micro-hypervisor and root task module, the latter configured to provide services related to kernel resources controlled by the micro-hypervisor. For example, the root task module may be responsible for management of kernel resources, such as memory or a device, requested by the VCBs. To that end, the root task module may define one or more APIs for use by the VCBs to communicate a request for a kernel resource. That is, an API exposed by the root task module of TCB may be accessed by a VCB to invoke the services of the TCB, e.g., to allocate memory to a device executing the VCB. Similarly, each VCB may define one or APIs that are exposed as interfaces to other VCBs for use to invoke the service of the VCB.

In an embodiment, each VCB (including its security and non-security related properties and APIs) may be verified by subjecting the VCB to enhanced verification analysis prior to deployment on the node. Enhanced verification analysis may include ensuring that the VCB conforms to an operational model with an appropriate level of confidence over an appropriate range of activity (e.g., inputs and outputs using the APIs, and operational states of the VCB). The operational model may then be configured to analyze conformance of the VCB to the appropriate property, i.e., to determine whether the VCB demonstrates the property. A combination of conformance by the VCB to the operational model and to the property provides assurance (i.e., grounds) for the level of confidence and, thus, verifies the VCB. For example, trustedness (i.e., a predetermined level of confidence in manifestation of the security property) of the VCB may be verified (i.e., confidence elevated to a sufficient level) by demonstrating the VCB manifests the security property, e.g., no module external to the VCB modifies a state related to security of the VCB without authorization. Accordingly, the enhanced verification analysis may, for example, include confirming (i.e., verifying) that an instruction issued by a module external to the VCB and having one or more arguments configured to alter an expected behavior or state of the VCB related to the property results in a violation (i.e., generation of a capability violation) such that the instruction is rejected (replied with an error code) or ignored and prevented from execution by the micro-hypervisor. As such, the TCB may be expanded to include the VCB that is verified for trustedness.

DESCRIPTION

FIG. 1 is a block diagram of a network environment 100 that may be advantageously used with one or more embodiments described herein. The network environment 100 illustratively includes a plurality of computer networks organized as a public network 120, such as the Internet, and a private network 130, such an organization or enterprise network. The networks 120, 130 illustratively include a plurality of network links and segments connected to a plurality of nodes 200. The network links and segments may embody local area networks (LANs) 110 and wide area networks (WANs) 150, including wireless networks, interconnected by intermediate nodes $200_I$, such as network switches or routers, to form an internetwork of nodes. The LANs 110 may, in turn, interconnect end nodes $200_E$ embodied as endpoints. In an embodiment, the endpoints may illustratively include, e.g., client/server desktop computers, laptop/notebook computers, process controllers, medical devices, data acquisition devices, mobile devices, such as smartphones and tablet computers, and/or any other intelligent electronic device having network connectivity that may be configured to implement a virtualization system. The nodes 200 illustratively communicate by exchanging packets or messages (i.e., network traffic) according to a pre-defined set of protocols, such as the Transmission Control Protocol/Internet Protocol (TCP/IP); however, it should be noted that other protocols, such as the HyperText Transfer Protocol Secure (HTTPS), may be advantageously used with the embodiments herein. In the case of private network 130, the intermediate node $200_I$ may include a firewall or other network device configured to limit or block certain network traffic in an attempt to protect the endpoints from unauthorized users. Unfortunately, such attempts often fail to protect the endpoints, which may be compromised.

Figure 2:
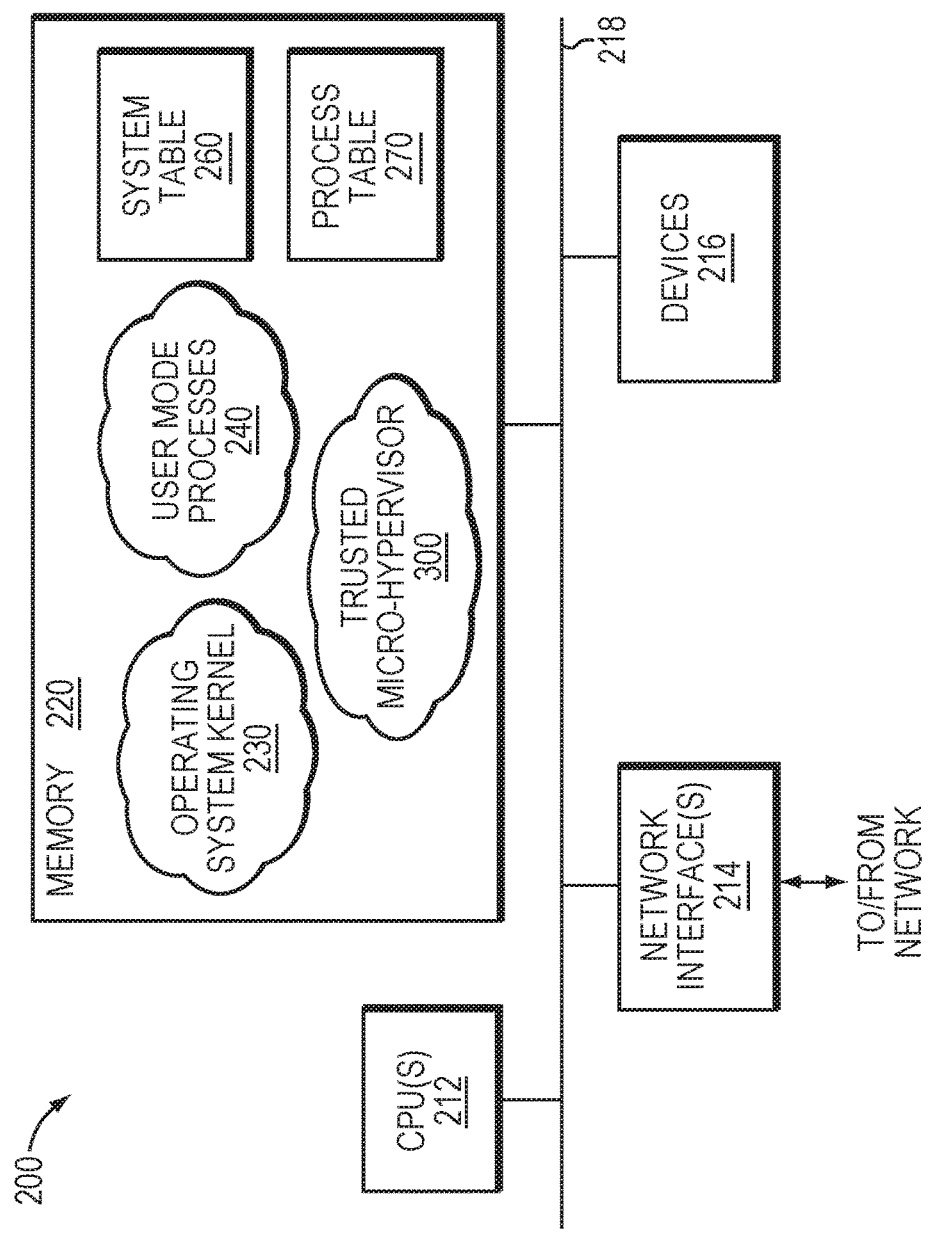
FIG. 2 is a block diagram of a node that may be advantageously used with one or more embodiments described herein.

FIG. 2 is a block diagram of a node 200, e.g., an end node $200_E$ or intermediate node $200_I$, that may be advantageously used with one or more embodiments described herein. The node 200 illustratively includes one or more central processing unit (CPUs) 212, a memory 220, one or more network interfaces 214 and one or more devices 216 connected by a system interconnect 218, such as a bus. The devices 216 may include various input/output (I/O) or peripheral devices, such as storage devices, e.g., disks. The disks may be solid state drives (SSDs) embodied as flash storage devices or other non-volatile, solid-state electronic devices (e.g., drives based on storage class memory components), although, in an embodiment, the disks may also be hard disk drives (HDDs). Each network interface 214 may contain the mechanical, electrical and signaling circuitry needed to connect the node to the network 120, 130 thereby to facilitate communication over the network. To that end, the network interface 214 may be configured to transmit and/or receive messages using a variety of communication protocols including, inter alia, TCP/IP and HTTPS.

The memory 220 may include a plurality of locations that are addressable by the CPU(s) 212 and the network interface(s) 214 for storing software program code (including application programs) and data structures associated with the embodiments described herein. The CPU 212 may include processing elements or logic adapted to execute the software program code, such as trusted threat-aware micro-hypervisor 300, and manipulate the data structures, such as system table 260 and process table 270. Exemplary CPUs may include families of instruction set architectures based on the x86 CPU and the x64 CPU.

An operating system kernel 230, portions of which are typically resident in memory 220 and executed by the CPU, functionally organizes the node by, inter alia, invoking operations in support of the software program code and application programs executing on the node. A suitable operating system kernel 230 may include proprietary and open source operating systems from a variety of commercial vendors or available publicly. Suitable application programs may include Internet browsers, document viewers or browsers, word processors, email clients and the like as is known to persons of skill in the art. Illustratively, the software program code may be implemented as operating system processes of the kernel 230. As used herein, a process (e.g., a user mode process) is an instance of software program code (e.g., an application program) executing in the operating system that may be separated (decomposed) into one or more of threads, wherein each thread is a sequence of execution within the process.

It will be apparent to those skilled in the art that other types of processing elements and memory, including various computer-readable media, may be used to store and execute program instructions pertaining to the embodiments described herein. Also, while the embodiments herein are described in terms of software program code, processes, and computer, e.g., application programs stored in memory, alternative embodiments also include the code/processes/programs being embodied as modules consisting of hardware, software, firmware, or combinations thereof.

Trusted Threat-Aware Micro-Hypervisor

Figure 3:
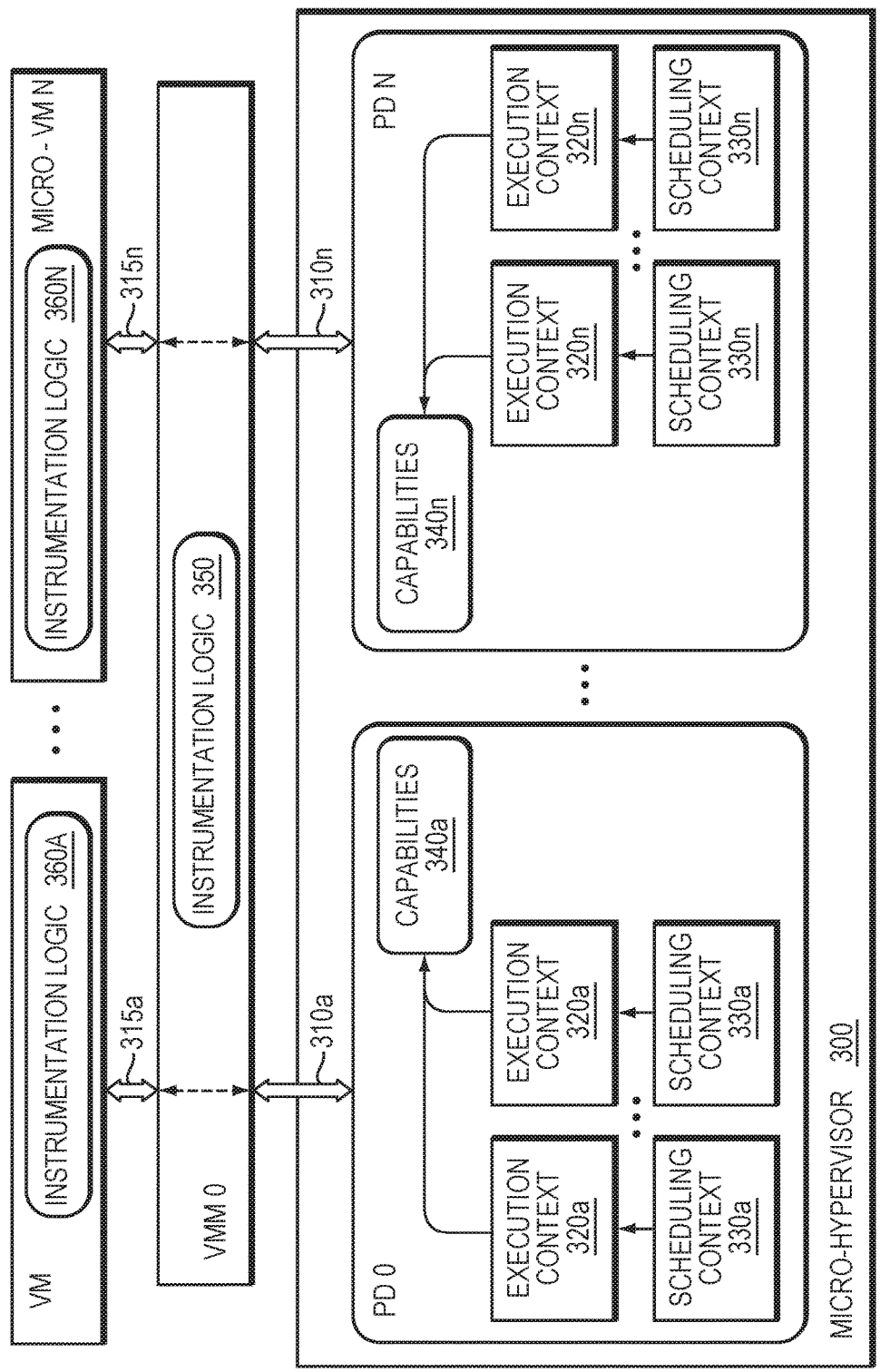
FIG. 3 is a block diagram of a trusted, threat-aware micro-hypervisor that may be advantageously used with one or more embodiments described herein.

The embodiments herein provide a trusted, threat-aware micro-hypervisor that may be deployed in a virtualization system configured to facilitate run-time security analysis, including exploit and malware detection as well as threat intelligence collection, associated with one or more operating system processes executing on the node 200 of the network environment 100. FIG. 3 is a block diagram of the trusted, threat-aware micro-hypervisor 300 that may be advantageously used with one or more embodiments described herein. The trusted threat-aware micro-hypervisor (hereinafter "micro-hypervisor") may be embodied as a light-weight module disposed or layered beneath (underlying, i.e., directly on native hardware) the operating system kernel 230 executing on the node to virtualize the hardware and control privileges (i.e., access control permissions or capabilities) to kernel (e.g., hardware) resources of the node 200 that are typically controlled by the operating system kernel. That is, the micro-hypervisor may be implemented in an operationally efficient (i.e., light-weight or reduced kernel resource footprint) manner that maintains user experience (i.e., little performance degradation) at the node. Illustratively, the kernel resources may include (physical) CPU(s) 212, memory 220, network interface(s) 214 and devices 216. The micro-hypervisor may be configured to control access to one or more of the resources in response to a request by an operating system process to access the resource.

As a light-weight module, the micro-hypervisor may provide a virtualization layer having less functionality than a typical hypervisor. Accordingly, the micro-hypervisor may cooperate with a unique virtual machine monitor (VMM), i.e., a type 0 VMM, to provide additional virtualization functionality in an operationally and resource efficient manner. Unlike a type 1 or type 2 VMM (hypervisor), the type 0 VMM (VMM 0) does not fully virtualize the kernel (hardware) resources of the node and supports execution of only one entire operating system/instance inside one virtual machine, i.e., VM. VMM 0 may thus instantiate the VM as a container for the operating system kernel 230 and its kernel resources. In an embodiment, VMM 0 may instantiate the VM as a module having instrumentation logic 360A directed to determination of an exploit and malware in any suspicious operating system process (kernel or user mode). Illustratively, VMM 0 is a pass-through module configured to expose the kernel resources of the node (as controlled by micro-hypervisor 300) to the operating system kernel 230. VMM 0 may also expose resources such as virtual CPUs (threads), wherein there is one-to-one mapping between the number of physical CPUs and the number of virtual CPUs that VMM 0 exposes to the operating system kernel 230. To that end, VMM 0 may enable communication between the operating system kernel (i.e., the VM) and the micro-hypervisor over privileged interfaces 315a and 310a.

The VMM 0 may include software program code (e.g., executable machine code) in the form of instrumentation logic 350 (including decision logic) configured to analyze one or more interception points originated by one or more operating system processes to invoke the services, e.g., accesses to the kernel resources, of the operating system kernel 230. As used herein, an interception point is a point in an instruction stream where control passes to (e.g., is intercepted by) either the micro-hypervisor, VMM 0 or another virtual machine. An interception point may thus include, inter alia, a memory access request, a function call or a system call. For example in response to an interception point, VMM 0 may assume control over the operating system kernel 230 to enable monitoring of activity (including examination of a state) of the process to determine its suspiciousness and to enable detection of exploits or other potentially malicious behavior of malware. Suspiciousness may thus denote anomalous behavior of a process or its interception point (e.g., system call) that is not expected during run-time and, therefore, may indicate a certain probability of being an exploit or malware. Illustratively, the instrumentation logic 350 may include a classifier (not shown) that determines whether a process is suspicious (and categorize the activity) using pre-defined anomalous behaviors (monitored activity) of verified exploits and malware. Examples of a threat-aware micro-hypervisor, a VMM 0 and a micro-virtual machine are described in U.S. patent application Ser. No. 14/229,533 titled Threat-Aware Microvisor by Osman et al., filed Mar. 28, 2014 and issued on Aug. 22, 2017 as U.S. Pat. No. 9,740,857.

An exploit may be construed as information (e.g., executable code, data, one or more commands provided by a user or attacker) that attempts to take advantage of a computer program or system vulnerability, often employing malware. Typically, a vulnerability may be a coding error or artifact of a computer program that allows an attacker to alter legitimate control flow during processing of the computer program by an electronic device and, thus, causes the electronic device to experience undesirable or unexpected behaviors. The undesired or unexpected behaviors may include a communication-based or execution-based anomaly which, for example, could (1) alter the functionality of the electronic device executing application software in a malicious manner; (2) alter the functionality of the electronic device executing the application software without any malicious intent; and/or (3) provide unwanted functionality which may be generally acceptable in another context. To illustrate, a computer program may be considered a state machine where all valid states (and transitions between states) are managed and defined by the program, in which case an exploit may be viewed as seeking to alter one or more of the states (or transitions) from those defined by the program. Malware may be construed as computer code that is executed by an exploit to harm or co-opt operation of an electronic device or misappropriate, modify or delete data. Conventionally, malware may often be designed with malicious intent, and may be used to facilitate an exploit. For convenience, the term "malware" may be used herein to describe a malicious attack, and encompass both malicious code and exploits detectable in accordance with the disclosure herein.

As described herein, a system call provides an interception point at which a switch in privilege levels occurs in the operating system, i.e., from a privilege level of the user mode process to a privilege level of the operating system kernel. VMM 0 may intercept the system call and examine a state of the process issuing (sending) the call. The instrumentation logic 350 of VMM 0 may analyze the system call to determine whether the call is suspicious and, if so, instantiate (spawn) one or more "micro" virtual machines (VMs) equipped with monitoring functions that cooperate with the micro-hypervisor to detect anomalous behavior which may be used in determining an exploit. As used herein, the term "micro" VM denotes a virtual machine serving as a container that is restricted to a process (as opposed to the VM which is spawned as a container for the entire operating system). Such spawning of a micro-VM may result in creation of an instance of another module (i.e., micro-VM N) that is substantially similar to the VM, but with different (e.g., additional) instrumentation logic 360N illustratively directed to determination of an exploit or malware in the suspicious process by, e.g., monitoring its behavior.

In an embodiment, the spawned micro-VM illustratively encapsulates an operating system process, such as user mode process 240. The process may include one or more threads that may be encapsulated by the spawned micro-VM. In another embodiment, two or more related processes (e.g., sharing a user mode resource, such as memory) may be encapsulated by the micro-VM. In terms of execution, operation of the process is controlled and synchronized by the operating system kernel 230; however, in terms of access to kernel resources, operation of the encapsulated process is controlled by VMM 0. Notably, the resources appear to be isolated within each spawned micro-VM such that each respective encapsulated process appears to have exclusive control of the resources. In other words, access to kernel resources is synchronized among the micro-VMs and the VM by VMM 0 rather than virtually shared. Accordingly, VMM 0 may contain computer executable instructions executed by the CPU 212 to perform operations that initialize and implement the instrumentation logic 350, as well as operations that spawn, configure and control the VM and any of a plurality of micro-VMs (including instrumentation logic 360A-N). Similar to the VM, each micro-VM may be configured to communicate with the micro-hypervisor (via VMM 0) over privileged interfaces 315$n$ and 310$n$. Notably, the privileged interfaces 310$a$-$n$ and 315$a$-$n$ may be embodied as a set of defined hyper-calls, as described further herein.

In an embodiment, the micro-hypervisor 300 may be organized to include a plurality of protection domains (e.g., PD 0-N) illustratively bound to the VM and one or more micro-VMs, respectively. As used herein, a protection domain is a container for various data structures, such as execution contexts, scheduling contexts, and capabilities associated with the kernel resources accessible by an operating system process. Illustratively, the protection domain may function at a granularity of an operating system process (e.g., a user mode process 240) and, thus, is a representation of the process. Accordingly, the micro-hypervisor may provide a protection domain for the process and its run-time threads executing in the operating system. The main protection domain (PD0) of the micro-hypervisor controls all of the kernel resources available to the operating system kernel 230 (and, hence, the user mode process 240) of the VM via VMM 0 and, to that end, may be associated with the services provided to the user mode process by the kernel 230, such as information in the process table 270. The spawned micro-VM (e.g., micro-VM N) is illustratively associated with (bound to) a copy of PD 0 (e.g., PD N) which, in turn, may be bound to the process, wherein such binding may occur through memory context switching.

As used herein, an execution context 320 is illustratively a representation of a thread (associated with an operating system process) and, to that end, defines a state of the thread for execution on CPU 212. In an embodiment, the execution context may include inter alia (i) contents of CPU registers, (ii) pointers/values on a stack, (iii) a program counter, and/or (iv) allocation of memory via, e.g., memory pages. The execution context 320 is thus a static view of the state of thread and, therefore, its associated process. Accordingly, the thread executes within the protection domain associated with the operating system process of which the thread is a part. For the thread to execute on a CPU 212 (e.g., as a virtual CPU), its execution context 320 is tightly linked to a scheduling context 330, which may be configured to provide information for scheduling the execution context 320 for execution on the CPU 212. Illustratively, the scheduling context information may include a priority and a quantum time for execution of its linked execution context on CPU 212.

In an embodiment, the capabilities 340 may be organized as a set of access control permissions to the kernel resources to which the thread may request access. Each time the execution context 320 of a thread requests access to a kernel resource, the capabilities 340 are examined. There is illustratively one set of capabilities 340 for each protection domain, such that access to kernel resources by each execution context 320 (i.e., each thread of an execution context) of a protection domain may be defined by the set of capabilities 340. For example, physical addresses of pages of memory 220 (resulting from mappings of virtual addresses to physical addresses) may have associated access permissions (e.g., read, write, read-write) within the protection domain. To enable an execution context 320 to access a kernel resource, such as a memory page, the physical address of the page may have a capability 340 that defines how the execution context 320 may reference that page. Illustratively, the capabilities may be examined by hardware (e.g., a hardware page fault upon a memory access violation) or by program code. As described herein, violation of a capability in a protection domain may be an interception point, which returns control to the VM (e.g., the VM or micro-VM N) bound to the protection domain.

Advantageously, the micro-hypervisor 300 may be organized as separate protection domain containers for the operating system kernel 230 (PD 0) and one or more operating system processes (PD N) to facilitate further monitoring and understanding of behaviors of the process and its threads. Such organization of the micro-hypervisor also enforces separation between the protection domains to control the activity of the monitored process. Moreover, the micro-hypervisor 300 may enforce access to the kernel resources through the use of variously configured capabilities 340 of the separate protection domains. Unlike previous virtualization systems, separation of the protection domains to control access to kernel resources at a process granularity enables detection of anomalous behavior of an exploit. That is, in addition to enforcing access to kernel resources, the micro-hypervisor enables analysis of the operation of a process within a spawned micro-VM to detect exploits or other malicious code threats that may constitute malware.

Trusted Computing Base (TCB)

Figure 4:
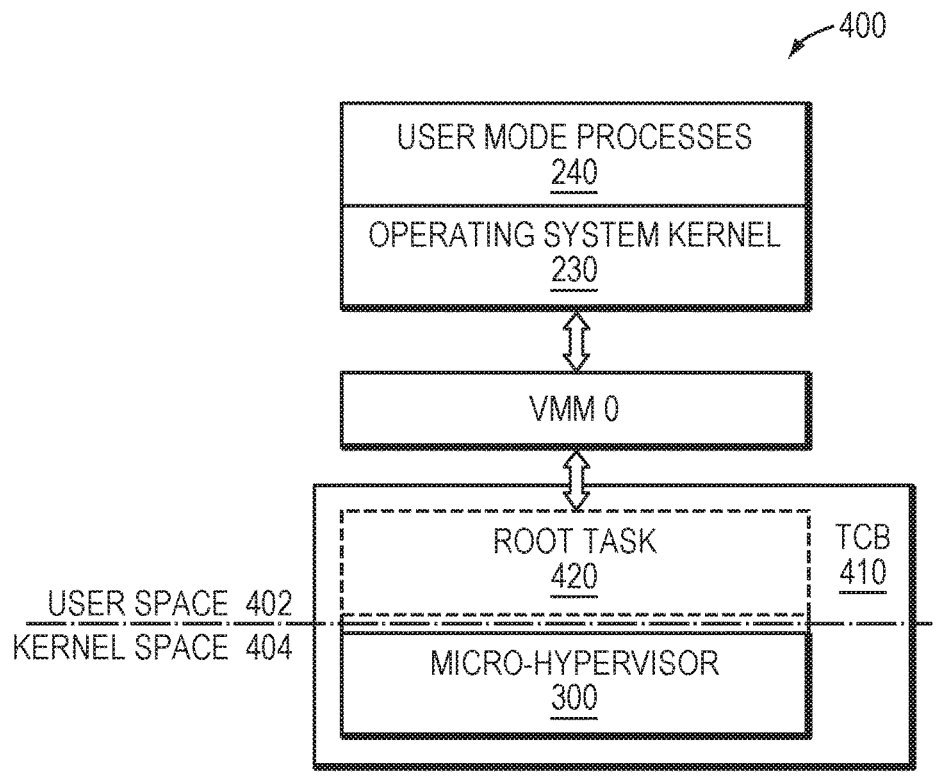
FIG. 4 is a block diagram of a micro-virtualization architecture including a trusted computing base (TCB) that may be advantageously used with one or more embodiments described herein.

In an embodiment, the micro-hypervisor may be stored in memory as a module of a trusted computing base that also includes a root task module (hereinafter "root task") configured to cooperate with the micro-hypervisor to create (i.e., load) one or more other modules executing on the CPU of the node. FIG. 4 is a block diagram of a micro-virtualization architecture 400 including the trusted computing base (TCB) 410 that may be advantageously used with one or more embodiments described herein. Illustratively, the micro-virtualization architecture 400 may organize the memory 220 as a user space 402 and a kernel space 404. The micro-hypervisor 300 may be disposed as a relatively small code base (e.g., approximately 9000-10,000 lines of code) that underlies the operating system kernel 230 and executes in the kernel space 404 of the architecture 400 to control access to the kernel resources for any operating system process (kernel or user mode). Notably, the micro-hypervisor 300 executes at the highest privilege level of the hardware (CPU) thereby to virtualize access to the kernel resources of the node in a light-weight manner.

The user mode processes 240 and operating system kernel 230 may execute in the user space 402 of the micro-virtualization architecture 400, although it will be understood to those skilled in the art that one or more of the user mode processes may execute in another address space defined by the operating system kernel. Illustratively, the operating system kernel 230 may execute under control of the micro-hypervisor 300 at a privilege level (i.e., a logical privilege level) lower than a highest privilege level of the micro-hypervisor, but at a higher CPU privilege level than that of the user mode processes 240. In addition, VMM 0 and its spawned VMs (e.g., the VM and micro-VM N) may execute in user space 402 of the architecture 400 as processes having a relatively larger code base (e.g., approximately 20,000-30,000 lines of code) than the micro-hypervisor, primarily due to the instrumentation logic 350, 360. As a type 0 virtual machine monitor, VMM 0 (and its spawned VM and micro-VMs) may execute at the highest (logical)

privilege level of the micro-hypervisor 300. That is, VMM 0 (and its spawned VM and micro-VMs) may operate under control of the micro-hypervisor at the highest micro-hypervisor privilege level, but may not directly operate at the highest CPU (hardware) privilege level.

In an embodiment, the root task 420 may be disposed as a relatively small code base (e.g., approximately 1000 lines of code) that overlays the micro-hypervisor 300 (i.e., underlies VMM 0) and executes in the user space 402 of the architecture 400. Through cooperation (e.g., communication) with the micro-hypervisor, the root task 420 may also initialize (i.e., initially configure) the loaded modules executing in the user space 402. To that end, the root task 420 may execute at the highest (absolute) privilege level of the micro-hypervisor. Illustratively, the root task 420 may communicate with the micro-hypervisor 300 to manage, e.g., allocate, the kernel resources to the loaded user space modules. In this context, allocation of the kernel resources may include creation of, e.g., maximal capabilities that specify an extent to which each module (such as, e.g., VMM 0) may access its allocated resource(s). For example, the root task 420 may communicate with the micro-hypervisor 300 through instructions to allocate memory and/or CPU resource(s) to VMM 0, and to create capabilities that specify maximal permissions allocated to VMM 0 when attempting to access (use) the resource(s). Such instructions may be provided over the privileged interface 310 embodied as one or more hyper-calls. Notably, the root task 420 is the only (software or hardware) entity that can instruct the micro-hypervisor with respect to initial configuration of such resources.

In an embodiment, the root task 420 may be implemented as a "non-long lived" process that terminates after creation and initial configuration of the user space processes (modules). The non-long lived nature of the root task is depicted by dash lining of the root task 420 in FIG. 4. Illustratively, the root task 420 is the first user space process to boot (appear) during power-up and initialization of the node, including loading and initial configuration of the user space modules and their associated capabilities; the root task then terminates (disappears). The root task 420 may thereafter be re-instantiated (reappear) during a reboot process, which may be invoked in response to an administrative task, e.g. update of VMM 0. Notably, the root task 420 may only appear and operate on the node in response to a (re)boot process, thereby enhancing security of the TCB 410 by restricting the ability to (re)initialize the micro-hypervisor 300 after deployment on the node 200.

As a trusted module of the TCB, the micro-hypervisor 300 is illustratively configured to enforce a security policy of the TCB that, e.g., prevents (obviates) alteration or corruption of a state related to security of the micro-hypervisor by a module (e.g., software entity) of or external to an environment in which the micro-hypervisor 300 operates, i.e., the TCB 410. For example, an exemplary security policy may provide, "modules of the TCB shall be immutable," which may be implemented as a security property of the micro-hypervisor, an example of which is no module of the TCB modifies a state related to security of the micro-hypervisor without authorization. In an embodiment, the security policy of the TCB 410 may be implemented by a plurality of security properties of the micro-hypervisor 300. That is, the exemplary security policy may be also implemented (i.e., enforced) by another security property of the micro-hypervisor, another example of which is no module external to the TCB modifies a state related to security of the micro-hypervisor without authorization. As such, one or more security properties of the micro-hypervisor may operate concurrently to enforce the security policy of the TCB.

Illustratively, the micro-hypervisor 300 may manifest (i.e., demonstrate) the security property in a manner that enforces the security policy. Accordingly, verification of the micro-hypervisor to demonstrate the security property necessarily enforces the security policy, i.e., the micro-hypervisor 300 may be trusted by demonstrating the security property. Trusted (or trustedness) may therefore denote a predetermined level of confidence that the micro-hypervisor demonstrates the security property (i.e., the security property is a property of the micro-hypervisor). It should be noted that trustedness may be extended to other security properties of the micro-hypervisor, as appropriate. Furthermore, trustedness may denote a predetermined level of confidence that is appropriate for a particular use or deployment of the micro-hypervisor 300 (and TCB 410). The predetermined level of confidence, in turn, is based on an assurance (i.e., grounds) that the micro-hypervisor demonstrates the security property. Therefore, manifestation denotes a demonstrated implementation that assurance is provided regarding the implementation based on an evaluation assurance level, i.e., the more extensive the evaluation, the greater the assurance level. Evaluation assurance levels for security are well-known and described in *Common Criteria for Information Technology Security Evaluation Part 3: Security Assurance Components*, September 2012, Ver 3.1 (CCMB-2012-09-003). For example, evaluation assurance level 7 includes formal design verification and test as confirmed independently (i.e., by a third party).

Figure 5:
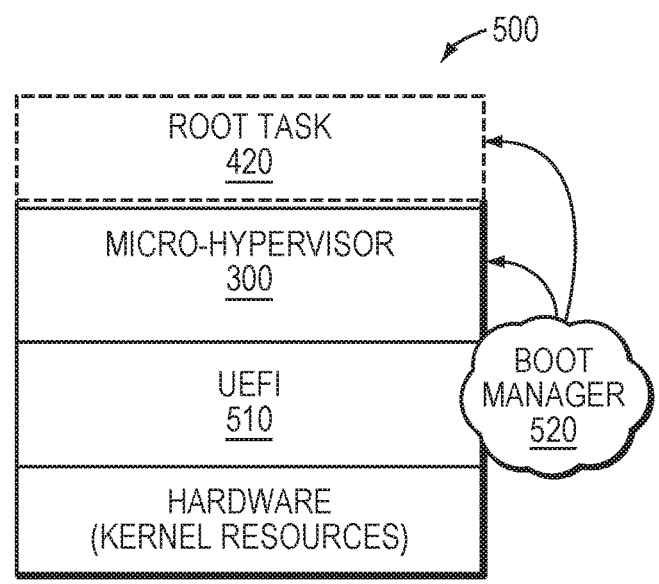
FIG. 5 is a block diagram illustrating a chain of loading that may be advantageously used with one or more embodiments described herein.

In an embodiment, trustedness may include both (i) manifestation of the security property in the micro-hypervisor code (e.g., no inherent security flaw) as a static attribute, as well as (ii) manifestation of the security property while the code executes on the CPU (e.g., no alteration by an exploit) as a dynamic attribute. That is, trustedness may include manifestation of the security property as both static and dynamic attributes. As such, secure loading of trusted code contributes to overall trustedness, i.e., a predetermined level of confidence that the security property manifests in the micro-hypervisor 300 as deployed on the node. To support (and maintain) such trustedness, a chain of loading may be configured to securely launch the micro-hypervisor 300 as a first software entity loaded into memory 220 of node 200 during a boot process. FIG. 5 is a block diagram illustrating a chain of loading 500 that may be advantageously used with one or more embodiments described herein. Illustratively, a unified extensible firmware interface (UEFI 510) implementation (i.e., a Basic Input Output System, BIOS) may be extended to provide the chain of loading 500 to securely launch the micro-hypervisor 300 for deployment on the node. After loading the micro-hypervisor 300, the UEFI 510 may load the root task 420 of the TCB 410 prior to loading any other software entity, such as VMM 0 or the operating system kernel 230. The chain of loading 500 provided by the UEFI 510 may be further configured to authenticate the micro-hypervisor code prior to launching. It should be noted that the UEFI is stored in firmware and, thus, is not to be construed as the first software entity loaded during a boot process.

In an embodiment, loading of the micro-hypervisor 300 and root task 420 is performed by a UEFI loader, e.g., boot manager 520, in accordance with an "early loading" procedure. The early loading procedure is illustratively provided by the hardware platform, e.g., including the UEFI 510, as part of an initialization (power-up) and boot sequence. Broadly stated, a power on self-test (POST) procedure may be invoked and executed by the CPU 212 in response to powering-on of the node 200. Firmware of the UEFI 510 may then be loaded to initialize the hardware (including the kernel resources) of the node prior to booting of software program code, such as UEFI application programs. The firmware may then invoke the boot manager 520 to launch one or more of the UEFI application programs, e.g., from a storage device. Illustratively, the first UEFI application program launched by the boot manager is the micro-hypervisor 300 and the second UEFI application program launched immediately thereafter is the root task 420. The boot manager 520 may thus control the boot order and location of the micro-hypervisor 300 and root task 420 by, e.g., configuring the memory 220, constructing any necessary data structures (such as system table 260 for run-time and boot services) and configuring interrupt interfaces (e.g., storage devices).

Enhanced Verification

In an embodiment, trustedness of the micro-hypervisor 300 may be verified by subjecting the TCB 410 (i.e., the micro-hypervisor and root task) to enhanced verification analysis prior to deployment on the node. Note that the enhanced verification technique may also be applied to one or more modules other than the TCB as described later herein. Illustratively, the enhanced verification is performed in a computing environment (e.g., including processing and memory resources to accommodate execution of the software programs constituting the enhanced verification system described herein) that are separate and apart from the network environment deploying the trusted micro-hypervisor. Enhanced verification may be configured to ensure that the TCB 410 conforms to an operational model (e.g., constructed with key elements of the code base) with an appropriate level of confidence over an appropriate range of activity (e.g., inputs, outputs, and operational states). The operational model may be a sufficient specification of the behavior of the micro-hypervisor as modeled in a typed Lambda calculus, e.g., a pure functional programming language such as Haskell and OCaml. For example, the operational model may include sufficient detail to specify the hyper-calls (e.g., how hyper-call parameters are encoded in binary form) and to describe, e.g., in abstract logical terms, the effect of each hyper-call. It should be noted that the operational model is not an implementation of the micro-hypervisor (e.g., 'C++' source code), but rather a functional specification of desired effects (e.g., effects of each hyper-call) on the behavior of the micro-hypervisor. The operational model may be rendered executable by generating suitable functional programming language code (e.g., Haskell and OCaml) from a theorem prover (e.g., Coq or Isabelle). For example, a Haskell to 'C' translator may be used to generate C or C++ code, which is then compiled to machine code. Alternatively, machine code may be generated directly (i.e., compiled) from the functional programming language code, e.g., OCaml. In addition, interpreted functional programming languages (e.g., Haskell bytecodes) also may be used. It should be noted that the executable operational model may be used for automated consistency verification (e.g., compliance testing) between the operational model and the TCB, as described herein.

The theorem prover may provide an environment to verify the security property as a theorem with respect to (against) the operational model (i.e., logically prove the security property in a model domain). Illustratively, the security property may be entered into the theorem prover as a thereom (e.g., trustedness of the micro-hypervisor) to be verified against the operational model using, e.g., Hoare logic. The theorem prover may then be used to determine whether the operational model demonstrates the security property (as both static and dynamic attributes) and, thus, the security policy. In response, the operational model may be modified when the security property is not demonstrated. For example, failure to demonstrate the security property may be static (e.g., a coding error) or dynamic (e.g., deficient of protection, such as insufficient checking of invalid hyper-call parameters). In other words, the operational model (i.e., functional specification) of the micro-hypervisor 300 may be iteratively modified until the security property is demonstrated. In this manner assurance is provided that the TCB (e.g., micro-hypervisor) demonstrates the security property, thus yielding the predetermined level of confidence that the TCB 410 manifests the security policy. Notably, assurance of the consistency between the operational model and the code base of the TCB is also used to achieve a sufficient level of confidence (i.e., trustedness) that the TCB demonstrates the security policy. Therefore, the operational model may serve as a convenient and efficient proxy to verify both correctness and manifestation of the security property.

Illustratively, formal verification of the TCB involves: (i) mathematical and logical verification (e.g., by humans) of the operational model against the security property (i.e., manifestation of the security property); (ii) development of the code base (e.g., by humans) to comply with the operational model (e.g., iteratively modify the code base to achieve manifestation of the security property); (iii) comprehensive compliance testing (preferably by automation) to ensure consistency between the code base and the operational model; and (iv) verification of the hardware/firmware of the node. For example, a 10,000 lines of code software stack (e.g., TCB 410 including the micro-hypervisor 300 and root task 420) may require as many as hundreds of man years of effort to perform the unwieldy and complex human intensive task of formal verification (without the hardware verification indicated in (iv) above) on the TCB, where a majority of such effort would be directed to the assurance of consistency between the operational model and the TCB. Such verification may require services of highly-educated and skilled software developers, e.g., having PhDs and post doctorate degrees. In sum, the assurance of consistency between the operational model and the TCB may be lengthy and complex. Therefore, it is desirable to provide an efficient method for assuring consistency between the operational model and the TCB (i.e., as indicated in (iii) above) based on a prescribed level of confidence, i.e., a predetermined level of confidence sufficient to assure trustedness.

As noted, trustedness may be defined in terms of the predetermined level of confidence that is appropriate for a particular deployment of the micro-hypervisor. Such a level of confidence may be quantified based on the operational model. Indeed, a definition of trustedness may be rooted in commercial value of the micro-hypervisor. That is, a micro-hypervisor with a higher level of confidence with respect to manifesting the security property than that of another virtualization system has a greater commercial value. Approaching a 100% level of (i.e., complete) confidence requires formal verification (including comprehensive compliance testing) of the entire TCB, which may be too extensive and, thus, impractical for many deployments. Therefore, a practical solution may mandate a predetermined level of confidence (e.g., not less than 90%) with associated risks (e.g., vulnerabilities) that is appropriate for a particular deployment. It should be noted that the predetermined level of confidence with respect to the security property may be prescribed with respect to code that has been proven correct, i.e., code that has been compliance tested and determined to be sufficiently correct for product commercialization. As such, the predetermined level of confidence (i.e., assurance) in trustedness may be increased (and the associated risk reduced) with additional compliance testing. That is, assurance in trustedness may monotonically increase with an amount of compliance testing.

Enhanced Verification Using a Modularized Architecture

The embodiments herein are directed to a technique for verifying (e.g., for trustedness) a compound software code (e.g., an application program) using a modularized architecture. That is, a modularized architecture may be used to verify the compound software code. The compound software code may be complex in terms of functionality provided, e.g., a self-driving car application. The compound software code may be divided into smaller components or modules (i.e., having fewer lines of software code) organized as an application workflow wherein the software modules provide various services. As used herein, a service is a self-contained unit of functionality of a module that manifests as an invocable operation via a well-defined interface. Illustratively, one or more sets of properties may be provided for the modules, wherein at least one property is security related and remaining (i.e., non-security related) properties are directed to the services. For example, one property may be that the module will not crash (non-security related), whereas another property (the security-related property) may be that the module is not altered by external factors. Critical services of certain modules may involve higher privilege levels and crucial (more robust) properties of the application (e.g., acceleration or steering of the self-driving car). Illustratively, the compound software code is divided into smaller modules so as to facilitate verification of the properties directed to the services provided by each of the modules as well as respective interfaces of the modules so as to verify an overall (i.e., comprehensive) property of the compound software as a whole. That is, verification of the compound software as whole may be achieved by verifying the properties (i.e., security and non-security related) of the services provided by the smaller modules and their respective interfaces that results in the overall property of the compound software being verified. Illustratively, the compound software may be divided into modules of sufficiently small size (i.e., lines of code), so that the properties of the modules may be verified using the technique described herein, while each module retains a size (i.e., lines of code) sufficient to encompass one or more of the services. Note that the verified overall property may be different from the verified properties of the modules.

As described herein, the properties of the modules may be verified in accordance with an enhanced verification procedure to thereby transform each of the modules into verified code bases (VCBs). The services of the VCBs may then be combined to provide functionality of the compound software code using the well-defined interfaces, such as application programming interfaces (APIs). Assurance of trustedness may be provided when verifying a security related property of a VCB or the TCB. In this manner, each VCB and the TCB may be verified for trustedness such that each VCB (or the TCB) verified for a same set of security related properties may be encompassed together. That is, each VCB verified to a same assurance of trustedness as the TCB may be subsumed (i.e., encompassed) into the trusted code base. Further, such notion of assurance may be extended so that VCBs verified as demonstrating (i.e., manifesting) a set of non-security related properties may be encompassed together. Accordingly, one or more groups of VCBs may be encompassed together, wherein each VCB may be verified as demonstrating a different set of properties. In an embodiment, a first group may be verified to a same assurance of trustedness (i.e., manifesting a same set of security related properties) as the TCB, while a second group may be verified to a non-security related property. Note that verification of security and non-security related properties may require demonstrating subordinate properties (e.g., API properties) related to interactions between the TCB and the VCB and/or among the groups of VCBs. That is, verification of API-related subordinate properties, such as functional correctness, may be necessary to verify overall security and non-security related properties.

In an embodiment, the VCBs may be disposed over a TCB of a node, such as an endpoint, in various configurations to communicate with the TCB and each other via the APIs. The TCB illustratively includes the micro-hypervisor and the root task module, the latter configured to provide services related to kernel resources controlled by the micro-hypervisor (e.g., services related to physical memory of physical devices). For example, the root task module may be responsible for management of kernel resources, such as memory or a device, requested by the VCBs. To that end, the root task module may define one or more APIs for use by the VCBs to communicate a request for a kernel resource. That is, an API exposed by the root task module of the TCB may be accessed by a VCB to invoke a service of the TCB, e.g., to allocate memory to a device executing the VCB. Similarly, each VCB may define one or more APIs that are exposed as interfaces to other VCBs for use to invoke the service of the VCB.

In an embodiment, the compound software code may be organized as a plurality of VCBs, wherein each module may have one or more dependencies embodied as services. Each VCB may include a service verified to have one or more properties (e.g., the VCB will not crash and resilience against and/or absence of errors) using the enhanced verification procedure described herein. The TCB may be verified to have a security property (e.g., no module of the TCB modifies a state related to security of the micro-hypervisor without authorization), as well as other non-security related properties (e.g., the micro-hypervisor will not crash). Accordingly, the modular architecture may be used to verify the properties of the VCBs to thereby verify the compound software code, which may include the TCB. Note however, as previously mentioned, verifying the compound software includes verifying a set of API properties (i.e., subordinate properties) related (i.e., pertaining) to interactions between the TCB and the VCB and/or among the groups of VCBs.

Figure 6:
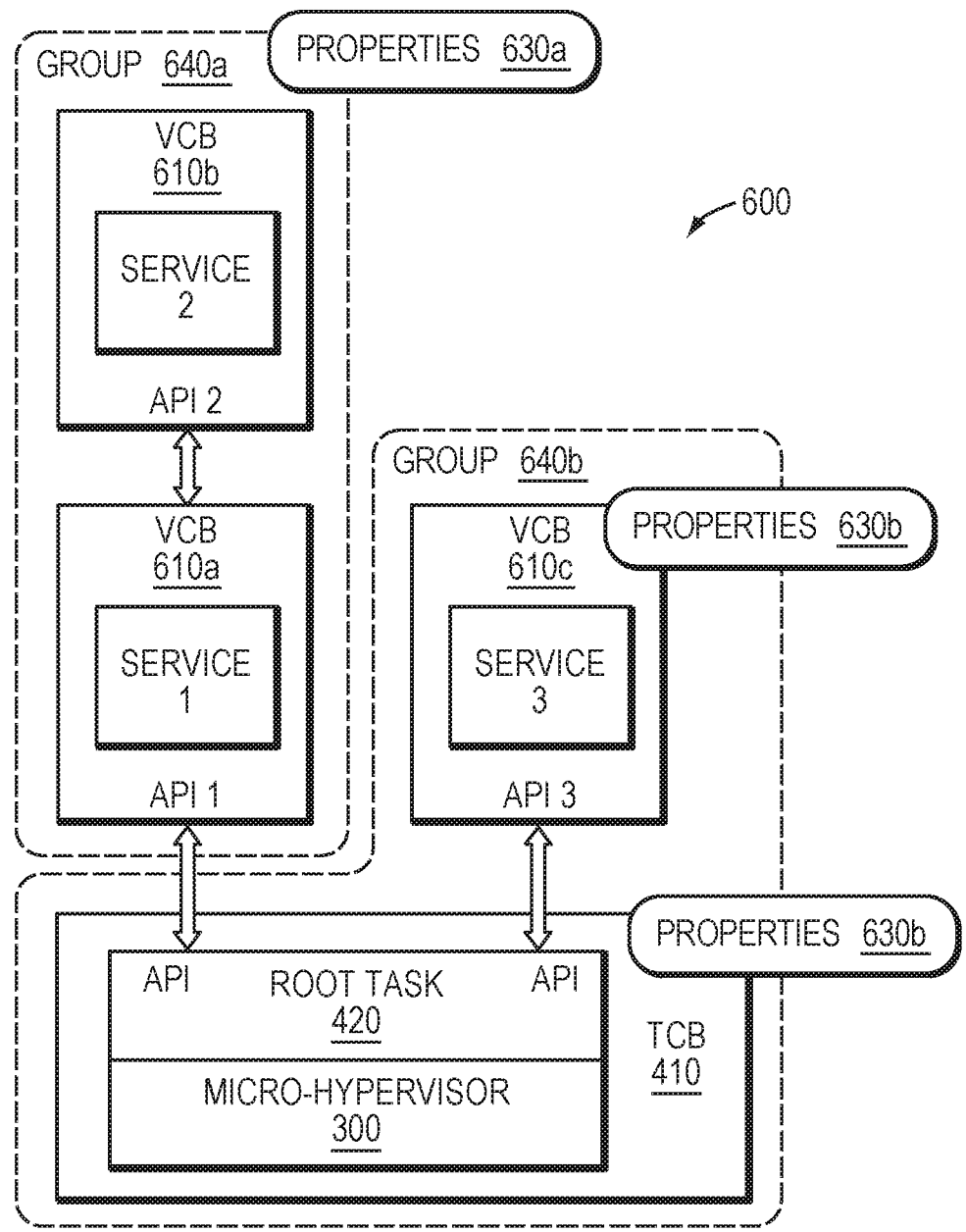
FIG. 6 is a block diagram illustrating a configuration of verified code bases (VCBs) disposed over the TCB that may be advantageously used with one or more embodiments described herein.

The compound software code may be arranged in a modular architecture having various configurations, such as a tree structure or daisy chain structure, of the VCBs. FIG. 6 is a block diagram illustrating a configuration 600 of the VCBs disposed over the TCB that may be advantageously used with one or more embodiments described herein. The VCBs 610*a-c* may communicate via APIs defined and provided by either the VCBs or the root task module 420 of the TCB 410. Each VCB 610 may receive an input and may provide an output, wherein the inputs and outputs are embodied as APIs. VCBs may be organized as a group 640 according to verified properties (i.e., verified as manifested by each VCB of the group) in order for the software code to be verified (e.g., VCBs 610*a,b* may be organized as group 640*a* with verified properties 630*a*). Notably, a property of the VCB may be verified along with one or more subordinate properties, such as functional correctness, related to a defined API. Further, each group 640 and their respective APIs may have a different set of properties 630. For example, the TCB 410 and VCB 610c may have security related properties 630b, such that the TCB 410 and VCB 610c have a same assurance of trustedness. Illustratively, the different services of the different VCBs 610 may be organized as the application workflow configuration. For example, the VCBs may be cascaded such that VCB 610a and VCB 610c may provide services (services 1 and 3) that directly interface with TCB 410. In addition, VCB 610b (and service 2) may interface directly to VCB 610a. That is, VCB 610b (and service 2) may be disposed over VCB 610a (and service 1) such that the output of VCB 610a (API1 exposed by VCB 610a) may only be used by VCB 610b. As such, verifying the properties 630b for the group 640b may illustratively require demonstrating one or more API-related properties, such as functional correctness (not shown), for API3 of VCB 610c as well as API-related properties for the root task 420 and the micro-hypervisor 300. That is, verification of a property for a group includes demonstrating the property (e.g., properties 630b) for each module (i.e., root task 420, micro-hypervisor 300, and VCB 610c) of that group as well as demonstrating one or more subordinate properties (e.g., API-related properties) pertaining to interactions among the modules of the group (e.g., VCB 610c via API 3 interacting with root task 420). Note that the subordinate properties need not be security related, even if the overall property (e.g., properties 630b for group 640b) sought to be verified is security related. That is, a first type of an overall property may differ from a second type of a subordinate property needed to verify that overall property.

In an embodiment, each VCB (including its security and non-security related properties and APIs) may be verified by subjecting the VCB to enhanced verification analysis prior to deployment on the node. Enhanced verification analysis may include ensuring that the VCB conforms to an operational model with an appropriate level of confidence over an appropriate range of activity (e.g., inputs and outputs using the APIs, and operational states of the VCB). The operational model may then be configured to analyze conformance of the VCB to the appropriate property (or subordinate property), i.e., to determine whether the VCB demonstrates the property. A combination of conformance by the VCB to the operational model and to the property (or subordinate property) provides assurance (i.e., grounds) for the level of confidence and, thus, verifies the VCB. For example, trustedness (i.e., a predetermined level of confidence in manifestation of the security property) of the VCB may be verified (i.e., confidence elevated to a sufficient level) by demonstrating that the VCB manifests the security property, e.g., no module external to the VCB modifies a state related to security of the VCB without authorization. Accordingly, the enhanced verification analysis may, for example, include confirming (i.e., verifying) that an instruction issued by a module external to the VCB and having one or more arguments configured to alter an expected behavior or state of the VCB related to the property results in a violation (i.e., generation of a capability violation) such that the instruction is rejected (replied with an error code) or ignored and prevented from execution by the micro-hypervisor.

Figure 7:
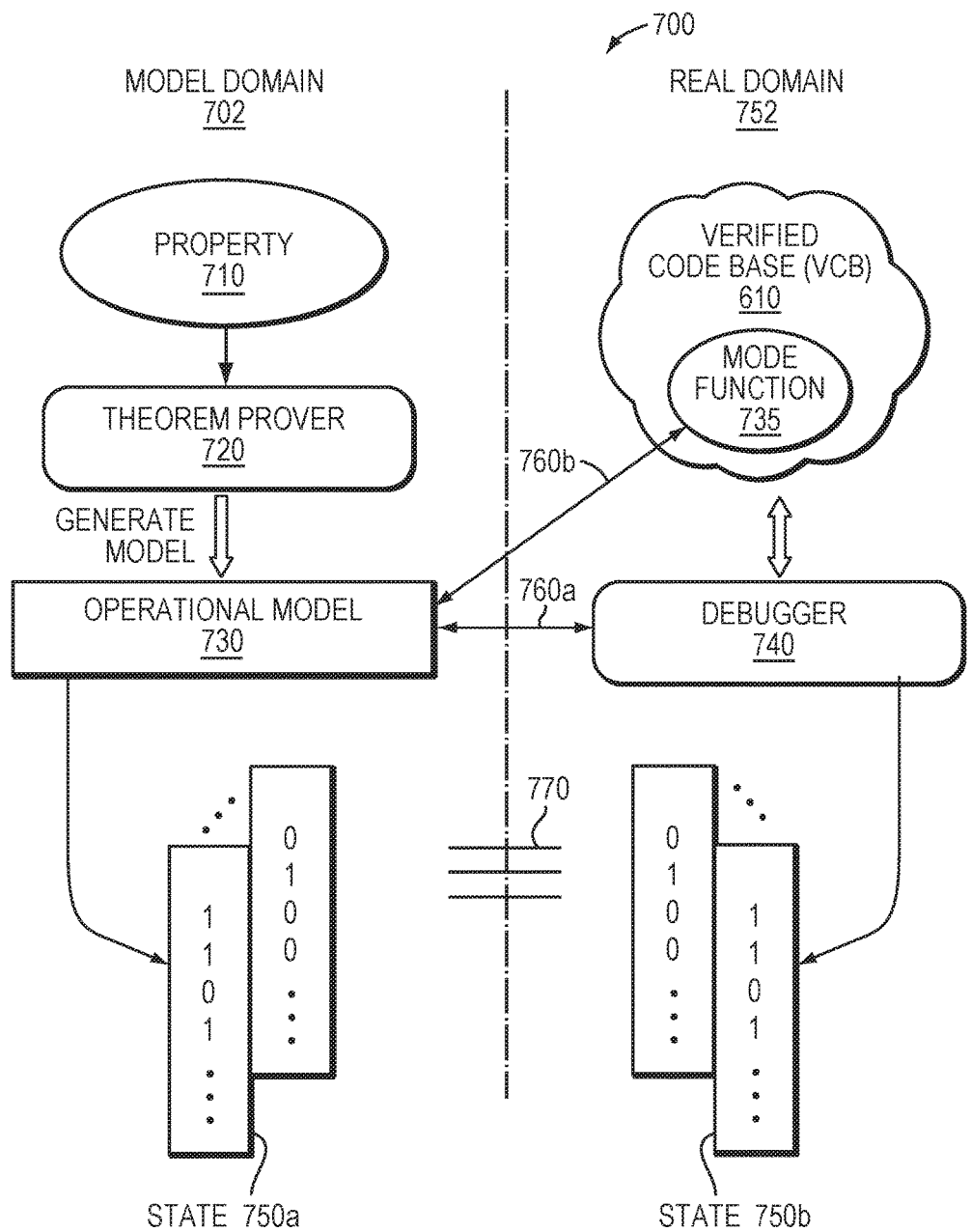
FIG. 7 is a block diagram of an enhanced verification arrangement that may be advantageously used with one or more embodiments described herein.

In an embodiment, the VCBs (and the TCB) may be configured to enable rapid compliance testing in accordance with an enhanced verification analysis that dramatically reduces the man years required to achieve near formal (i.e., greater than 90% confidence) verification of the VCB (or TCB). The enhanced verification analysis may be performed in a computing environment separate and apart from the network environment deploying the trusted micro-hypervisor. FIG. 7 is a block diagram of an enhanced verification arrangement that may be advantageously used with one or more embodiments described herein. As applied to a VCB, the enhanced verification arrangement 700 may include a model domain 702 which provides the ability to verify (i.e., logically prove) a property (or subordinate property) 710 of the VCB against the operational model 730. The verification arrangement 700 may also include a real domain 752 that executes the VCB as the actual object (i.e., binary code) sought to be verified, e.g., assured of trustedness. Verification (e.g., assurance of trustedness) is provided when (i) the property (or subordinate property) 710 is demonstrated within the model domain 702 and (ii) the real domain 752 sufficiently conforms to the model domain 702. Note that assurance of trustedness is provided when property (or subordinate property) 710 is security related.

The enhanced verification arrangement 700 may further include a "mode" function 735 of the VCB that captures a state 750b of the VCB to ensure consistency with a corresponding state 750a of the operational model 730. Illustratively, the mode function 735 may be software code (i.e., a state descriptor) configured to capture (e.g., via a dump operation) the state 750b of the VCB (e.g., at a point in time) and to express that state in a manner that can be compared with extracted state 750a from the operational model 730. Illustratively, the mode function implements a function to provide a view or recording of the state (e.g., dump state operation), which dumps the state 750b of the VCB after a number of instructions of the VCB have executed. A checkpoint communication 760a between a debugger 740 (e.g., a control module) in the real domain 752 and the operational model 730 may be used to initiate capture of the states 750a,b respectively for comparison. Alternatively, a checkpoint communication 760b between the operational model 730 in the model domain 702 and the mode function 735 of the VCB in the real domain 752 may be used to initiate capture of the states 750a,b respectively for comparison. The checkpoint and state comparison may occur automatically (i.e., without human intervention) thereby to reduce an otherwise labor intensive process. In an embodiment, the operational model 730 may be further configured to analyze conformance to the property (or subordinate property) 710. Such conformance between the operational model 730 and the VCB may be assured or verified (i.e., to the predetermined level of confidence) when a sufficient number of states (related to security) match between the VCB and the operational model. In other words, conformance to the property (or subordinate property)710 is verified, e.g., for the predetermined level of confidence, when there is sufficient test coverage between the model domain 702 and the real domain 752.

For example, trustedness (i.e., a predetermined level of confidence in manifestation of a security related property) of the VCB may be verified (i.e., confidence elevated) by demonstrating that an API issued by a module (e.g., VMM 0) external to the VCB and having one or more arguments configured to alter an expected behavior or state of the VCB related to the property results in a violation (i.e., generation of an error) such that the API is rejected (reply with error code) or ignored and prevented from execution by the VCB. To that end, binary code of the VCB may be tested to execute an input (e.g., an operation manifested as an API issued by VMM 0 to invoke a service) with a resulting output (e.g., denial of services manifested as an error) and an associated operational state 750b. Illustratively, the operational state may be expressed as a VCB dump object provided by the state descriptor. The operational model 730 may be similarly tested to execute the inputs with resulting outputs and associated operational states 750*a* (e.g., expressed as model dump objects). The VCB and model dump objects may then be compared, e.g. using conventional software testing methodologies that include an automated testing environment to verify consistency. Illustratively, such automated, on-demand state-based consistency verification (e.g., compliance testing) between the operational model 730 and the VCB enables comparison 770 of respective operational states so as to verify that the VCB demonstrates the property (or subordinate property) 710.

Figure 8:
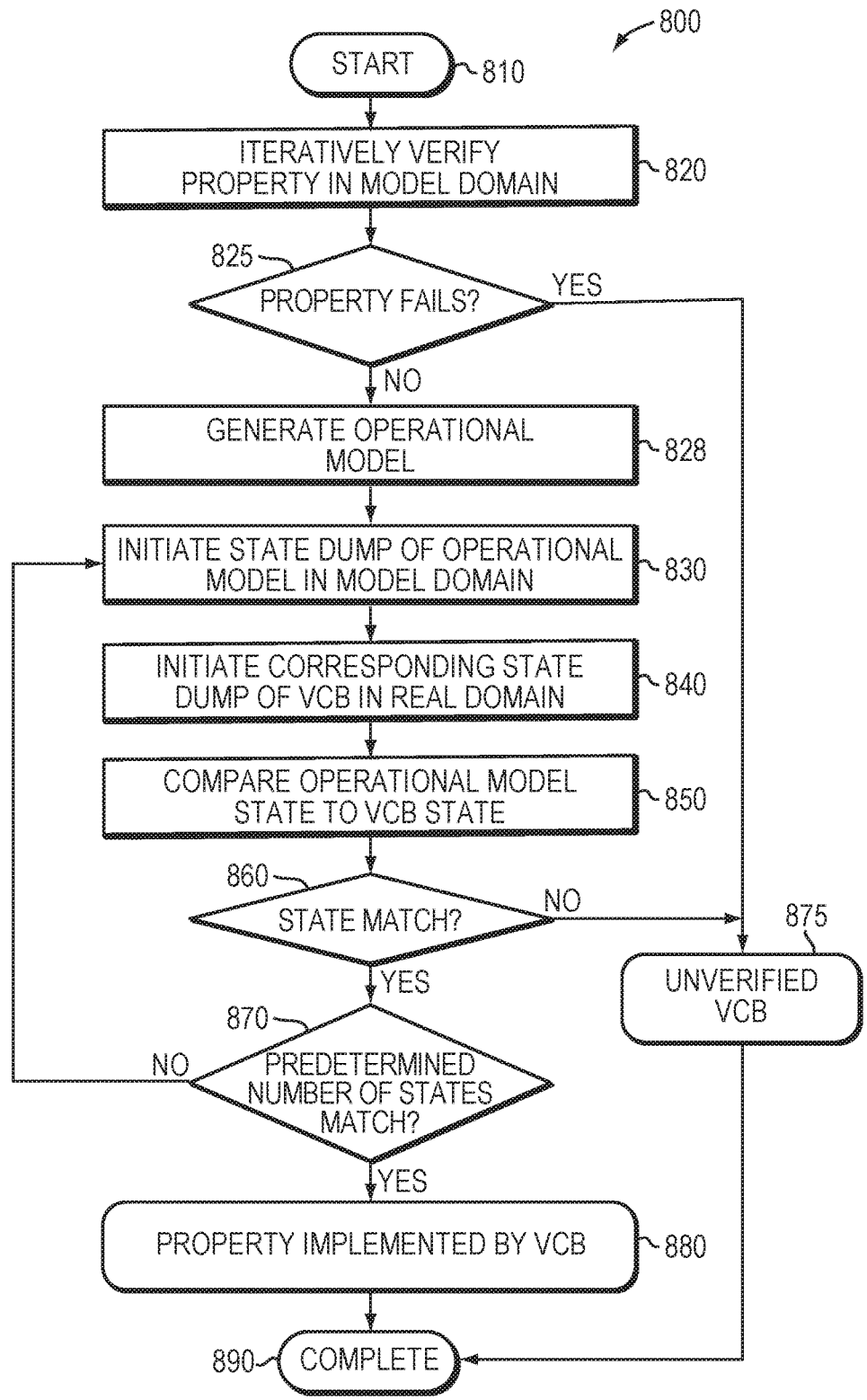
FIG. 8 is an example procedure for enhanced verification that may be advantageously used with one or more embodiments described herein.

FIG. 8 is an example procedure for enhanced verification that may be advantageously used with one or more embodiments described herein. The procedure 800 starts at step 810 and continues to step 820 where the security property is iteratively verified in the model domain by the theorem prover (i.e., logical verification that the operational model manifests the property). At step 825, a determination is made as to whether the property fails. If so, the VCB is deemed unverified (e.g., untrusted) at step 875 and the procedure completes at step 890. However, if the property does not fail (i.e., the operational model progresses in manifesting the property), the operational model may be generated from the theorem prover at step 828 to render an executable operational model (e.g., a binary compiled from generated OCaml code, or Haskell bytes-codes).

A state dump of the operational model (i.e., the operational model executable) is initiated in the model domain at step 830 and, at step 840, a corresponding state dump of the VCB is initiated in the real domain. At step 850, the state dumps of the operational model and VCB are compared and, at step 860, a determination is made as to whether the states match. If not, the VCB is deemed unverified at step 875 and the procedure completes at step 890. However, if the states match, then a determination is made (step 870) as to whether a predetermined number of states (related to the property) have been found to match. If not, the procedure returns to step 830 where a state (i.e., a next state) dump of the operational model iteratively continues. If the predetermined number of states have been found to match, then the predetermined number of matched states correspond to a predetermined level of confidence that the property is implemented by the VCB (step 880), thereby rendering the VCB verified (e.g., a trusted VCB). The procedure then completes at step 890.

Advantages of the embodiments described herein are directed to verification of a compound software code (application program) by independently verifying properties of constituent modules, wherein the properties relate to intended functions (services) of the modules. Each module is embodied as a VCB and may be interconnected to other VCBs (via APIs) in a variety of configurations to form the compound software code. By independently verifying a property of the VCB via the enhanced verification procedure, the collective properties of the compound software code may be verified in an efficient manner. The advantages are further directed to the controlled input and output APIs of the VCBs with regard to verifying subordinate properties related to the APIs. The input API to each VCB is controlled as a result of verification of the underlying module (VCB/TCB) and the output API of the VCB is also controlled as a result of verification of the property of the VCB and subordinate properties related to the API. The input/output APIs may be defined and proven correct (i.e., verified for the API-related properties) in a manner similar to that described for a hyper-call. Accordingly, the input/output APIs are consistent with the verified properties of the VCBs to thereby enable verification of all of the overall properties of the compound software code. Specifically, the service of each VCB exposes an API such that another VCB using the API may be confident that the property which has been proven correct for the service will be correct (i.e., will not result in different behavior). Examples of the properties (non-security related) include crash resilience and absence of bugs/errors, although it is to be understood that the properties of the VCBs may include security properties.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

storing a compound software code in a memory connect to a central processing unit (CPU) adapted to execute the compound software code, the compound software code being divided into modules;

verifying that the compound software code implements a first property by verifying one or more second properties of the modules using an enhanced verification procedure to demonstrate that the modules manifest the one or more second properties and to transform the modules into verified code bases (VCBs), each VCB having an operational model, the enhanced verification procedure including (i) generating an executable of the operational model of a corresponding VCB, (ii) capturing a state dump of the executable of the operational model, (iii) capturing a corresponding state dump of an executable of the corresponding VCB, and (iv) iteratively comparing states of the executable of the operational model and the executable of the corresponding VCB until a predetermined number of the states match, wherein the predetermined number of matched states correspond to a predetermined level of confidence that a respective second property is implemented by the corresponding VCB; and executing services of the VCBs on the CPU in combination to provide functionality of the compound software code using interfaces.

2. The method of claim 1 wherein verifying the one or more second properties comprises:

executing the operational model in a functional programming language.

3. The method of claim 1 wherein the one or more second properties of the modules are subordinate properties that include at least one security related property and one or more service related second properties of the VCBs.

4. The method of claim 1 wherein the interfaces are application programming interfaces (APIs) and wherein verifying the one or more second properties of the modules includes verifying the APIs of the VCBs.

5. The method of claim 4 wherein executing the combined services of the VCBs comprises:
communicating with one of a trusted code base (TCB) and other VCBs using the verified APIs and an additional API of the TCB, wherein the VCBs are disposed over the TCB.

6. The method of claim 1 wherein each VCB has size of lines of software code that enables verification of the respective second property using the enhanced verification procedure.

7. The method of claim 5 wherein
the VCBs are organized as one or more groups according to the verified properties and wherein one or more of the verified APIs of each group of VCBs are exposed to invoke services of a respective group of VCBs.

8. The method of claim 7 wherein a verified set of second properties of a first group is different from the verified set of second properties of a second group.

9. A system comprising:
a central processing unit (CPU) configured to execute a compound software code divided into modules; and
a memory configured to store the modules, the compound software code verified to implement a first property by an enhanced verification to demonstrate that the modules manifest one or more second properties to transform the modules into verified code bases (VCBs), each VCB having an operational model, the services of the VCBs combined to provide functionality of the compound software code using interfaces, the enhanced verification configured to:
generate an executable of the operational model of a corresponding VCB;
capture a state dump of the executable of the operational model;
capture a corresponding state dump of an executable of the corresponding VCB; and
iteratively compare states of the executable of the operational model and the executable of the corresponding VCB until a predetermined number of the states match, wherein the predetermined number of matched states correspond to a predetermined level of confidence that a respective second property is implemented by the corresponding VCB.

10. The system of claim 9 wherein the executable of the operational model is executed in a functional programming language.

11. The system of claim 9 wherein the one or more second properties are subordinate properties that include at least one security related property and one or more service related second properties of the VCBs.

12. The system of claim 9 wherein the interfaces are application programming interfaces (APIs) and wherein the enhanced verification further verifies the APIs of the VCBs.

13. The system of claim 12 wherein the VCBs are disposed over a trusted code base (TCB) in a configuration that enables communication with one of the TCB and the VCBs using the verified APIs and an additional API of the TCB.

14. The system of claim 13 wherein each VCB has a size of lines of software code that enables the enhanced verification of the respective second property.

15. The system of claim 14 wherein the VCBs are organized as one or more groups according to verified second properties.

16. The system of claim 13 wherein the verified APIs implement one or more third properties subordinate to the one or more second properties.

17. The system of claim 15 wherein the verified second properties of a first group are different from the verified second properties of a second group.

18. A non-transitory computer readable medium including program instructions for execution on a processor of a node on a network, the program instructions divided into modules configured to:
execute services using interfaces, wherein the program instructions are verified to implement a first property by verifying second properties of the modules using an enhanced verification procedure to demonstrate that the modules manifest the properties to transform the modules into verified code bases (VCBs), each VCB having an operational model, the enhanced verification procedure including (i) generating an executable of the operational model of a corresponding VCB, (ii) capturing a state dump of the executable operational model, (iii) capturing a corresponding state dump of an executable of the corresponding VCB, and (iv) iteratively comparing states of the executable of the operational model and the executable of the corresponding VCB until a predetermined number of the states match, wherein the predetermined number of matched states correspond to a predetermined level of confidence that the second property is implemented by the corresponding VCB; and
combine the services of the VCBs to provide functionality of the program instructions using the interfaces.

19. The non-transitory computer readable medium of claim 18 wherein the respective executable of the operational model is executed in a functional programming language.

20. The non-transitory computer readable medium of claim 18 wherein the interfaces are application programming interfaces (APIs) and wherein the enhanced verification procedure further verifies the APIs of the VCBs.

* * * * *